Oct. 20, 1959  T. J. KOESKE  2,909,274
CANTILEVERED CHAIN TAKE-UP FOR SETTLING TANKS
Filed Oct. 2, 1956
FIG. 1.
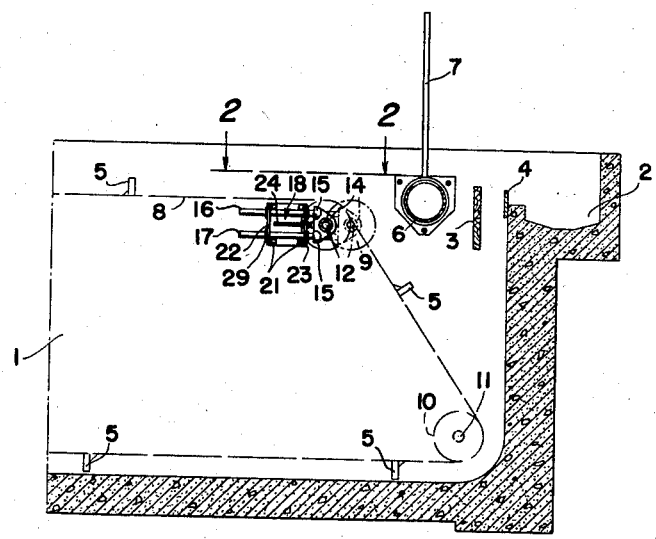
FIG. 2.
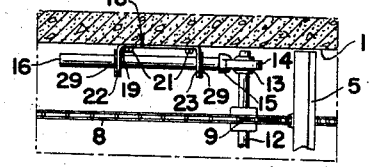
FIG. 4.
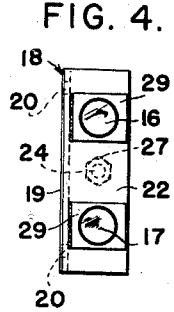
FIG. 3.
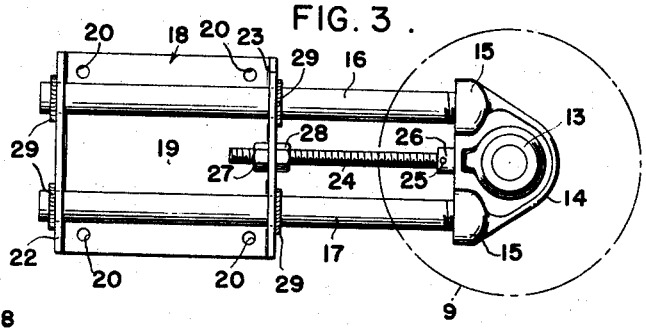
FIG. 5.
INVENTOR.
TOM J. KOESKE
BY *Ernst W. Schultz*
ATTORNEY

2,909,274

CANTILEVERED CHAIN TAKE-UP FOR SETTLING TANKS

Tom J. Koeske, Milwaukee, Wis., assignor to Chain Belt Company, Milwaukee, Wis., a corporation of Wisconsin Application October 2, 1956, Serial No. 613,567

3 Claims. (Cl. 198—208)

This invention relates to shaft mountings and particularly to bearing mounts providing movement of the shaft for taking up the slack of a chain and as for operating within a settling tank to carry flights extending the width of the tank to move the settled material toward an outlet end of the tank and to move the floating material to outlet means at the opposite end of the tank.

The invention provides the cantilevered support of the bearing carrying a given end of the take-up shaft within the tank so that the support does not interfere with the flights of the chain. The support is provided by two parallel pipes which are horizontally supported and slidable in the spaced flanges of a bracket which is bolted to the side wall of the tank. The take-up adjustment of the shaft is accomplished by screw means including a threaded member having one end connected to the bearing and the other end extending through one flange of the bracket. The unsupported free end of the threaded member is disposed between the flanges of the bracket and the two pipes.

A principal object of the invention is to provide a cantilevered bearing take-up support which allows the flights of the chain to move around the bearing in any retracted or extended position and which therefore does not need to be recessed in the wall of the tank.

Another object of the invention is to provide a more sturdy extension means at nominal cost.

Another object of the invention is to allow and facilitate the disassembly of the bearing from the sliding support.

Another object is to protect the threaded adjustment means against any damage as in the installation of the shaft in the tank.

The drawings furnished herewith illustrate the best mode of carrying out the invention as presently contemplated and set forth hereinafter.

In the drawings:

Figure 1 is a vertical, longitudinal, sectional view of the effluent end of a settling tank showing the shaft mounting secured to the side wall of the tank;

Fig. 2 is a sectional view through the side wall of the tank taken on line 2—2 of Fig. 1 to show the bearing mounting as fixed thereto;

Fig. 3 is an enlarged side elevation of the bearing mounting and shown in the extended position;

Fig. 4 is an end view of the supporting bracket of the bearing mounting as shown in Fig. 3; and Fig. 5 is an elevational view of the other end of the shaft mounting.

The tank 1 of concrete construction as shown in the drawings includes the effluent trough 2 extending across the end of the tank to receive the water, or other liquid, passing under the baffle 3 and over the weir 4. The series of cross-members or flights 5 which extend the width of the tank move the settled material toward the other end of the tank, not shown, and return in the opposite direction to move the floating material toward the trough 6 which is periodically rotated as by the handle 7, to remove such material from the tank.

The series of scrapers or flights 5 comprising metal or wood members are carried at spaced intervals by a parallel pair of chains including the chain 8 which is spaced from the side wall of the tank shown, and extends over the upper and lower sprockets 9 and 10. The lower sprocket 10 carried on shaft 11 extending across the tank below baffle 4 is located within the lower end of the tank so that flights 5 are directed along the floor of the tank. Shaft 12, which is horizontally adjustable for taking up the slack in the chain, carries the chain sprocket 9 at the height necessary to allow the flights moving towards trough 6 to extend slightly above the surface of the liquid in the tank.

Each end of shaft 12 is separately supported at the wall of the tank as by the bearing 13 shown in the drawings and having an outer case housing 14 which allows limited movement of bearing 13 to accommodate limited changes in the alignment of shaft 12 as in the course of such horizontal adjustment. Housing 14 is formed with the two enlarged socket members 15 having threaded bores receiving the corresponding threaded ends of the pipes 16 and 17. The openings of socket members 15 are spaced to dispose pipes 16 and 17 in parallel relation and at right angles to the axis of bearing 13. Pipes 16 and 17 are supported within tank 1 by the bracket 18 having a flat, rectangular intermediate section 19 having holes 20 for the bolts 21 for securing the bracket against the wall of tank 1.

The flanges 22 and 23 at opposite ends of bracket 18 are formed integrally with intermediate section 19 thereof and as fixed in tank 1 are vertical and project inwardly of the wall of the tank to carry pipes 16 and 17 extending through corresponding aligned holes formed in the flanges. Longitudinal movement of the pipes provides a horizontal movement of bearing 14 and the adjustment of shaft 12 to take up the slack in chain 8 as desired.

The adjustment referred to is provided by the threaded rod 24 having one end fixed by the pin 25 in the projecting boss 26 formed as a part of housing 14 between socket members 15. Rod 24 extends through the flange 23 adjacent to housing 14 and between pipes 16 and 17 and is movable with respect to the flange as upon movement of pipes 16 and 17 providing the adjustment of bearing 13 as described. The nuts 27 and 28 assembled on rod 24 on each side of flange 23 allow such adjustment and upon tightening of both nuts 27 and 28 against flange 23 firmly secure bearing 13 in the desired position.

The nuts 27 and 28 also provide means for effecting movement of the pipes 16 and 17 in either direction by first loosening and turning one nut away from the flange and then turning the other nut against the flange as required. By re-tightening the first nut, the bearing 13 is immediately re-secured in the desired position. The bearing mounting is intended for use in tanks of considerable size for the support of shafts up to and over 4 inches in diameter.

Inasmuch as the pitch of chain 8 may be 6 inches or over, an adjustment range of 10 inches is generally desired therefor. The present invention provides the sturdy cantilevered support of the shaft while providing ease of adjustment by means of nuts 27 and 28 for the desired take-up of chain 8.

To facilitate fabrication, the holes in flanges 22 and 23 are formed over-size and the reinforcement plates 29 are welded to the flanges upon assembly of the pipes 16 and 17. The holes in plates 29 may thus be provided with a close fit of the pipes to provide the desired bearing support of the pipe which will allow their sliding in the holes when under the loads involved. Dimensional variations in the pipes and in the distance between pipes 16 and 17 may also be accommodated thereby.

The bearing mounting is sturdy and adequately supported by reason of the structural rigidity of pipes 17 requiring no special fabrication other than the threaded ends thereof. The entire mounting provides a rugged construction with the end of the threaded rod located between pipes 17 and within the dimension of bracket 18 so that it is generally protected against becoming bent as in the course of installation of the shaft 12 or the flights 5.

The mounting provides the cantilevered support of bearing 13 and may thus project from the wall of the tank without interfering with the ends of flights 5 which move around bearing 13 and extend as close to the wall of the tank as possible for efficient operation of the tank. Such interference is avoided by locating the mounting within the general area defined by the run of the chain toward and away from sprocket 9.

Pipes 16 and 17 as threaded within the cast housing 14 are rigidly secured with respect to each other and provide an inexpensive but sturdy cantilever for such support of bearing 13 and shaft 12. In the installation of shaft 12 an entire mounting assembly may be placed on each end of the shaft before lowering into the tank, and each bracket 18 bolted to the respective side wall of the tank while the shaft is held in place. The bearing 13 does not need to be moved on the shaft 12 because the bracket may be mounted on the wall without being recessed, which recessing would be required if the usual take-up were employed to provide the longer adjustment required.

Various modes of carrying out the invention are contemplated as within the scope of the following claims particularly pointing out and distinctly claiming the subject matter which is regarded as the invention.

I claim:

1. In a settling tank having a conveyor and a shaft having at least one sprocket, said conveyor including a series of flights extending the width of the tank to move the settled material in one direction and a chain connected at intervals thereof to said flights to move the latter and having a return run over said sprocket, means for supporting an end of said shaft within and from a wall of said tank without interferring with the movement of said flights and for adjustment of the shaft and sprocket to take up the slack in said chain, comprising a bearing assembled on said end of the shaft and having a housing, vertically spaced parallel pipes having corresponding ends threadedly secured within said housing and extending beneath said return run of the chain, a bracket having spaced flanges with reinforced openings through which said pipes extend, and having a section intermediate said flange fixed to the wall of the tank and providing the support of said pipes for length-wise movement thereof in said apertures and the corresponding adjustment of said shaft and sprocket, a threaded rod having one end fixed to said housing and extending through one of said flanges and between the pipes, the other, free end of said rod being disposed at all times between said flanges and said pipes so as to be protected against damage, and nuts assembled on said rod on each side of said last named flange and providing the aforesaid desired adjustment and securement of said shaft and sprocket.

2. In a settling tank having a shaft carrying a chain conveyor extending between opposite walls of the tank, means supporting each end of said shaft for adjustment thereof and for taking up the slack in the conveyor chain, at least one of said means comprising a bracket secured to the corresponding wall of the tank and having spaced, parallel flanges, each said flange having spaced holes with corresponding holes of each flange in an alignment parallel to that of the other corresponding holes, a shaft bearing having a cast housing, said housing having spaced, threaded holes opening in the same direction, pipes having threaded ends rigidly fixed in the corresponding holes of said housing and slideable in the respective holes of the flanges of said bracket, a threaded rod having one end fixed to said housing and extending through one of said flanges between the pipes extending therebetween, the other, free end of said rod being protected against damage by being disposed between said flanges and pipes, and nuts assembled on said rod on each side of said last named flange and providing the desired adjustment and securement of said rod and bearing, said pipes extending only in said same direction providing the support of the shaft without interference with the parts of the chain conveyor moving about said shaft.

3. In a settling tank having a conveyor and a shaft having at least one sprocket, said conveyor including a series of flights extending the width of the tank to move the settled material in one direction and a chain connected at intervals thereof to said flights to move the latter and having a return run over said sprocket, means for supporting an end of said shaft within and from a wall of said tank without interfering with the movement of said flights and for adjustment of the shaft and sprocket to take up the slack in said chain, comprising a bearing assembled on said end of the shaft and having a housing, vertically spaced parallel pipes having corresponding ends threadedly secured within said housing and extending beneath said return run of the chain, a bracket having spaced flanges with reinforced apertures through which said pipes extend and having a section intermediate said flanges fixed to the wall of the tank and providing the support of said pipes for lengthwise movement thereof in said apertures and the corresponding adjustment of said shaft and sprocket, and manually operable screw means connecting said housing and one flange of said bracket for the aforesaid desired adjustment and securement of said shaft and sprocket and being disposed between said pipes and between said housing and the other flange of said bracket for protection against damage.

References Cited in the file of this patent

UNITED STATES PATENTS

| | | |
|---|---|---|
| 2,291,733 | Lemmon | Aug. 4, 1942 |
| 2,480,294 | Hume | Aug. 30, 1949 |
| 2,776,764 | Palmleaf | Jan. 8, 1957 |
| 2,808,924 | Wood | Oct. 8, 1957 |